June 4, 1929.  J. T. WELCH  1,715,803
FISHING REEL
Filed July 13, 1925

Inventor:
Jack T. Welch,

Patented June 4, 1929.

1,715,803

UNITED STATES PATENT OFFICE.

JACK T. WELCH, OF DOWAGIAC, MICHIGAN, ASSIGNOR TO JAMES HEDDON'S SONS, OF DOWAGIAC, MICHIGAN, A CORPORATION OF MICHIGAN.

FISHING REEL.

Application filed July 13, 1925. Serial No. 43,146.

This invention relates to a fishing reel with which is associated a level winding mechanism, and it is particularly concerned with means by which a line guide carriage is reciprocated upon a traversing shaft with a minimum of resistance, with means for steadying the carriage evenly throughout its movements, with means by which the driving pawl is retained in place, and with means for facilitating a correct centering of certain of the parts, when assembled. These and other objects of my invention will appear from the description and claims to follow, taken in connection with the accompanying drawing wherein is shown a preferred embodiment thereof in the manner following:

Figure 1:
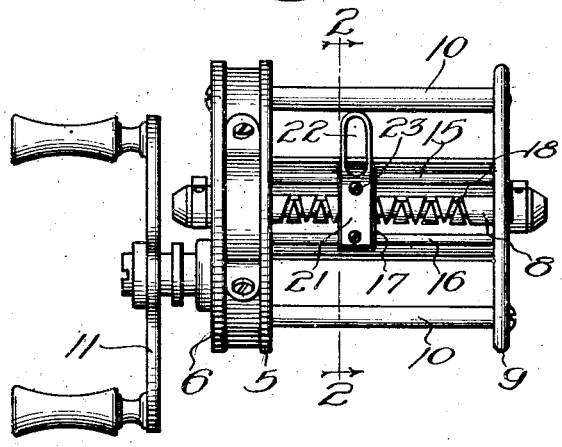
Figure 1 is a side elevation of the fishing reel.
Figure 2:
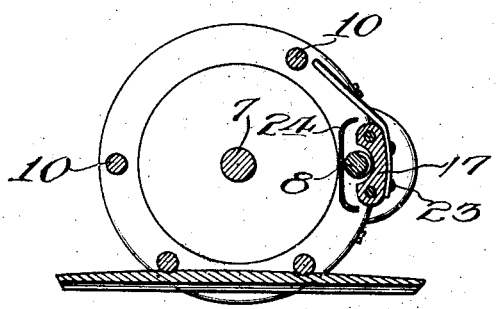
Fig. 2 is a transverse section therethrough, taken on line 2—2 of Fig. 1.

The principal parts of my reel include a chambered head having a stud plate 5 on which is fitted a cap plate 6 to provide an enclosure wherein may be received driving connections for rotating the spool and traversing shafts 7 and 8, respectively. These shafts are journaled at one end in a tail plate 9 connected to the reel head by pillars 10, motion being imparted to these shafts through a crank 11 in the usual manner. The traversing shaft rotates within suitable bearings, one of which, designated as 12 is mounted in the stud plate in such a manner as to present a flange 13 on its outer end between this plate and a pinion 14 which is fitted drivingly to the shaft end. The shaft end so journaled in this bearing is of reduced diameter and, because of the construction used, the pinion which may engage with the flange 13, but not the stud plate, serves to prevent end play of this shaft.

Extending between the stud and tail plates, and equidistantly from the traversing shaft, are a pair of guides in the form of bars 15 and 16 on which a reciprocable carriage 17 is slidingly mounted. As viewed in cross section (see Fig. 3) the carriage is formed on its inner side with a hollow for the accommodation of the traversing shaft, the upper and lower ends of the carriage being extended, respectively, over and under the traversing shaft for a desired distance. In the end portions of the carriage are formed longitudinal openings running from one side of the carriage to the other to provide bearings through which the two guide bars are received. A carriage so formed is free of the traversing shaft, its movements being controlled entirely by the two guide bars which serve both to prevent rotation as well as rocking of the carriage in the direction of its travel.

Figure 3:
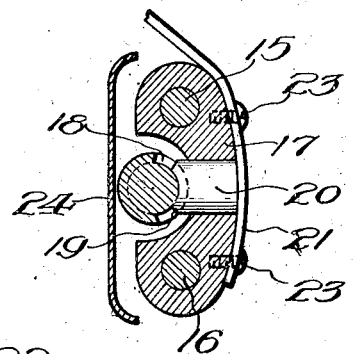
Fig. 3 is an enlarged detail in section, taken on line 3—3 of Fig. 4.
Figure 4:
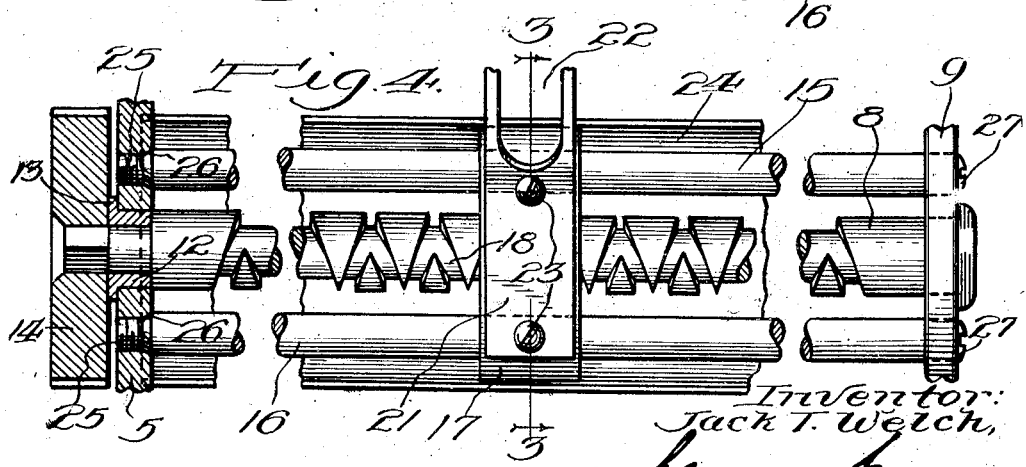
Fig. 4 is an enlarged detail in elevation, with a portion of the stud plate in section, of the traversing shaft and associated parts.

As is usual with level wind reels, a driving connection (not shown, except as to the pinion 14) leads from the crank 11 to the traversing shaft, so that the latter is rotated in response to movements of the former. In the traversing shaft are formed certain threads 18 with which co-operates the toothed head 19 of a pawl 20 which is oscillatably mounted in the carriage in such relation to the two guide bars that its head 19 lies midway of their axes and substantially in line with a plane extending between them. The pawl mounting on the carriage consists of a cylindrical aperture extending through from its inner to its outer side, so that the pawl may be inserted therewithin from the outer carriage side. When positioned operatively within its mounting, the tail end of the pawl is flush with the outer carriage side whereon I have removably secured a line guide 21 in the form of a plate having its upper portion inclined inwardly to overhang the carriage and provided with a slot 22 through which the line is passed. To secure the line guide to the carriage two screws 23 may be used, as shown in Fig. 3. The line guide thus serves as a retainer for the pawl in addition to a guide for the line.

To the inner side of the carriage is positioned a guard or shield 24. This preferably consists of a plate which is extended between the stud and tail plates to connect therewith, and may have its upper and lower edges inturned toward the carriage, as shown, whereby the line, together with the drip therefrom, is held from the traversing shaft.

The assembly of the traversing mechanism is facilitated by forming each guide bar with a reduced threaded end 25 adapted to engage within a co-operating screw threaded socket in the stud plate. Close to the bar end is a tapered shoulder 26 which fits in a seat upon the inner side of the stud plate when the bar is turned to final position. Because of this tapered shoulder and co-operating seat the guide bar remains correctly centered at all times, so as to avoid binding with the carriage in any of its positions. To facilitate assembly of the bars the opposite end of each which extends through the tail plate, may be slotted as at 27, thus permitting the use of a screw driver or other similar tool.

A reel answering to the above description has the advantage of being easily manufactured and assembled. It may also be operated with a minimum of friction, and such drag or resistance as is offered by the two guide bars is so located relative to the pawl that its position with respect to the traversing shaft will remain undisturbed. The assembly of the two guide bars is also such that they may be withdrawn, whereupon the carriage is also removable in case it should be desired to make any replacements or repairs, and all without taking the reel down or otherwise disturbing the position of any of its parts. For reasons such as these, the life of the present reel is prolonged and a highly satisfactory service may be obtained through a long period of time.

I claim:

1. In a fishing reel, the combination with a frame including a pair of spaced bearing plates, of connected spool and traversing shafts journaled therein, a carriage reciprocable lengthwise of the traversing shaft and driven thereby, and a guide bar engaging the carriage to provide a slidable mounting therefor, the bar being supported by the two bearing plates and having at one of its ends a cone shoulder with the bar extremity of reduced diameter and provided with screw threads, the associated bearing plate being formed with a threaded opening which terminates in a cone seat, the said bar end being adapted for screw-threaded connection therewith with its shoulder centered in the seat, the opposite bar end being rested in an opening in the other plate and having means wherewith a rotary tool may co-operate to rotate the bar, substantially as described.

2. In a fishing reel, the combination with a frame including a pair of spaced bearing plates, of connected spool and traversing shafts journaled therein, a pair of guide bars extending through the two plates in parallelism with the traversing shaft and equidistantly therefrom, means forming a screw threaded connection between one end of each bar and one plate, the opposite bar ends being supported in the other plate in a manner whereby each bar is movable therethrough, and a carriage slidably mounted on both bars and in driving engagement with the traversing shaft, substantially as described.

3. In a fishing reel, the combination of connected spool and traversing shafts, a carriage reciprocable along the traversing shaft, there being a socket extending through the carriage radially of the traversing shaft, a pawl within the socket and in engagement with the traversing shaft whereby to form a driving connection therefrom to the carriage, and a line guide removably mounted on the carriage having a portion of itself overlying the outer socket end whereby it serves as a retainer for the pawl therein, substantially as described.

4. In a fishing reel, the combination of connected spool and traversing shafts, a carriage reciprocable along the traversing shaft, there being a socket extended through the carriage radially of the traversing shaft, a pawl within the socket having a toothed head in driving engagement with the traversing shaft, a pair of guide bars parallel with the traversing shaft and equidistant therefrom, and a slotted plate removably secured to the outer carriage side extending upwardly therefrom to provide a line guide, the plate being also extended over the outer end of the socket to retain the pawl therein, substantially as described.

5. In a fishing reel, the combination of connected spool and traversing shafts, a pair of guide bars extending parallel therewith, a carriage slidably mounted on the guide bars, there being an opening extended through the carriage radially of the traversing shaft, a pawl movable through the opening into engagement with the traversing shaft and having its mounting within said opening, the outer pawl end being exposed upon the outer carriage side, and means removably secured to the carriage forming a retainer for the pawl, said means being extended upwardly also to provide a guide for a line, substantially as described.

6. In a fishing reel, the combination with a frame including a pair of spaced bearing plates, of connected spool and traversing shafts journaled therein, a carriage reciprocable lengthwise of the traversing shaft and driven thereby, and a guide bar engaging the carriage to provide a slidable mounting therefor, the bar being supported by the two plates and having one of its ends tapered and screw-threaded, the associated bearing plate being formed with a threaded opening having a tapered seat whereon the said bar end is centered when effecting a screw-threaded connection therewith, the opposite bar end being freely supported in an opening in the other plate, substantially as described.

JACK T. WELCH.